(12) United States Patent
Zawadka

(10) Patent No.: US 10,639,840 B2
(45) Date of Patent: May 5, 2020

(54) DEVICE AND METHOD FOR FORMING A COMPOSITE PANEL FROM A THERMOPLASTIC MATRIX

(71) Applicant: DAHER AEROSPACE, Saint Julien de Chedon (FR)

(72) Inventor: Laurent Zawadka, Sainte Pazane (FR)

(73) Assignee: DAHER AEROSPACE, Saint Julien de Chedon (FR)

(*) Notice: Subject to any disclaimer, the term of this patent is extended or adjusted under 35 U.S.C. 154(b) by 1032 days.

(21) Appl. No.: 15/035,478

(22) PCT Filed: Nov. 4, 2014

(86) PCT No.: PCT/EP2014/073617
§ 371 (c)(1),
(2) Date: May 9, 2016

(87) PCT Pub. No.: WO2015/067572
PCT Pub. Date: May 14, 2015

(65) Prior Publication Data
US 2016/0288405 A1    Oct. 6, 2016

(30) Foreign Application Priority Data
Nov. 9, 2013 (FR) .................... 13 60992

(51) Int. Cl.
| B29C 51/26 | (2006.01) |
| B29C 70/54 | (2006.01) |
| B29C 59/02 | (2006.01) |
| B29C 51/14 | (2006.01) |
| B29C 59/00 | (2006.01) |

(Continued)

(52) U.S. Cl.
CPC .......... *B29C 59/026* (2013.01); *B29C 51/145* (2013.01); *B29C 51/262* (2013.01); *B29C 59/005* (2013.01); *B29C 70/42* (2013.01); *B29C 70/541* (2013.01); *B29K 2101/12* (2013.01)

(58) Field of Classification Search
None
See application file for complete search history.

(56) References Cited

U.S. PATENT DOCUMENTS 5,066,222 A * 11/1991 Roos .................. B29C 49/4205
425/526

FOREIGN PATENT DOCUMENTS

| FR | 2 354 870 A1 | 1/1978 | |
| FR | 2354870 A1 * | 1/1978 | ........... B29C 51/165 |

(Continued)

*Primary Examiner* — Jeffrey M Wollschlager
*Assistant Examiner* — Armand Melendez
(74) *Attorney, Agent, or Firm* — Im IP Law; Chai Im; C. Andrew Im

(57) ABSTRACT

An apparatus and method for stamping a thermoplastic matrix composite blank, in view of heating and stamping the blank. The apparatus includes a machined blank and a frame. A plurality of cleats are fixed on the frame, extend towards the interior of the frame. The cleats delimit an internal opening surface of the frame, free from any obstacle. A locator is linked with a cleat and configured to cooperate with a hole machined in the blank. A heat sink is located near the locator and configured to maintain locally the blank temperature under the melting temperature of the polymer constituting the matrix, during the heating and transfer of the blank.

7 Claims, 3 Drawing Sheets

(51) Int. Cl.
*B29C 70/42* (2006.01)
*B29K 101/12* (2006.01)

(56) References Cited

FOREIGN PATENT DOCUMENTS

FR 2 417 378 A1 9/1979
FR 2 922 276 A1 4/2009

\* cited by examiner

DEVICE AND METHOD FOR FORMING A COMPOSITE PANEL FROM A THERMOPLASTIC MATRIX

RELATED APPLICATIONS

This application is a § 371 application from PCT/EP2014/073617 filed Nov. 4, 2014, which claims priority from French Patent Application No. 13 60992 filed Nov. 9, 2013, each of which is incorporated herein by reference in its entirety.

FIELD OF THE INVENTION

The invention concerns an apparatus and a method for stamping a thermoplastic matrix composite blank. The invention is more particularly but not exclusively adapted to the transformation of a composite blank formed of a lamination of plies, including continuous reinforcement fibers such as carbon, glass or aramid fibers in the form of fabrics or non-crimped layers, in a matrix made of a thermoplastic polymer such as polyether ether ketone or PEEK, polysulfone or PPS or polyetherimide or PEI, without these application examples being exhaustive. The invention is more particularly adapted to the stamping of a consolidated blank or a partially consolidated blank.

BACKGROUND OF THE INVENTION

Stamping is an operation whose purpose is to deform a flat raw part, known as a blank, between a die and an effector comprising a rigid punch or a bladder, in order to urge the blank against the die so that it fits its shape, and to conform said blank to a tridimensional shape. In the case of stamping a blank made of a composite material with a fibrous reinforcement, in the form of continuous fibers, this shape modification implies inter-laminar slipping between the plies and, locally, modifications of the distance between the fibers in controlled proportions, for passing from the plane configuration to the shaped configuration, the fibers not being able to deform plastically. These inter and intralaminar movements of the reinforcements are made possible by the matrix viscosity, the matrix being brought to its melting temperature for performing the stamping of a blank with a thermoplastic matrix.

Thus, the typical steps for the stamping a thermoplastic matrix composite blank comprise:
heating the blank beyond its melting temperature: this operation leads to the deconsolidation of the blank which loses its rigidity. Thus, this operation is generally performed while the blank lies on a film capable of resisting to the temperature, such as a polyimide film.
transferring the blank, with its holding film, on the die, said die being generally pre-heated to a temperature lower than the melting temperature
stamping;
cooling of the workpiece between the punch and the die and its re-consolidation.

This method of shaping is satisfactory, but presents some drawbacks related notably to the use of the polyimide film. Actually, being stamped with the blank, said film is not reusable, although being of a high price when the polymer constituting the composite matrix exhibits a high melting point, for example PEEK. In addition, as the film is not plastically deformable at the stamping temperature, it tends to wrinkle during this operation, the wrinkles being printed in the piece and causing fibers undulations.

Document FR 2 922 276 describes a method and a device for stamping a machined composite blank with a consolidated thermoplastic matrix; said device uses a transfer frame, that holds the blank on its periphery, without a support film, both during the heating and the transfer of the blank on the die. This same device of the prior art uses a locator traversing a bore made in the blank, which allows to position the blank in relation to the frame. This device of the prior art proves to be poorly reliable in the framework of an industrial production. In fact, the loss of the mechanical properties of the blank during heating frequently leads to its falling from the frame and even when the blank is further held by the locator, the bore tends to deform around said locator, leading to defects such as resin squeezing, pinching or undulations of the fibers; these defects, considering the continuous nature of the fibers, are likely to propagate at remote distances from the locator. During stamping, if the blank does not succeed in escaping from the locator, the latter causes tearing and hinders the interlaminar slipping, thus leading to defects.

The document FR 2 354 870 describes a device for stamping of a thin sheet of a thermoplastic material serving as coating to a container. Such a thin sheet, non-reinforced by fibers, tends to shrink during heating. For avoiding this phenomenon, the sheet is hooked on needles on its periphery. For avoiding the sheet tearing during stamping, a blank holder is used to wedge the edges of the sheet between the needles and the formed part. Such a method cannot be used in the case of a continuous fibers reinforced composite blank, the blank holder preventing the interlaminar slipping that is required for the forming. The term "machined blank" designates a blank which underwent a preparation, especially by material removal usually by high pressure water jet cutting or by routing with a cutting tool, in order to bring it to an adapted contour, or for cutting out particular shapes, such as a bore or a recess.

OBJECT AND SUMMARY OF THE INVENTION

The invention aims at solving the drawbacks of the prior art, and concerns to this end an apparatus for stamping a thermoplastic matrix composite blank, said apparatus comprising for heating and stamping the blank:
  a. a machined blank;
  b. a frame;
  c. a plurality of cleats fixed on said frame and extending towards its interior, delimiting an internal opening surface free of any obstacle;
  d. a locator linked with a cleat and able to cooperate with a hole in the laminated blank;
  e. said apparatus comprises a heat sink in the vicinity of the locator.

Thus, the heat sink is able to locally keep the blank temperature below the melting temperature of the polymer constituting the matrix, during the heating and the transfer of the blank, so that, in the vicinity of the heat sink, the blank is not brought to its melting temperature, is not subject to bulking and keeps some mechanical properties. Consequently, the locator ensures an efficient backing of the blank, without deformation of the blank around this locator.

This invention is advantageously implemented in accordance to the embodiments described hereunder which are to be considered individually or according to any operating technical combination.

Advantageously, the heat sink consists in the cleat holding the locator. This embodiment is particularly simple and economical to implement.

Advantageously, the heat sink cleat is made of a material whose thermal diffusivity is higher or equal to 10 times the thermal diffusivity of the polymer constituting the matrix of the blank. Thus, the cleat provides an efficient cooling of the blank face that touches it.

Advantageously, the cleat comprises a surface treatment to limit its absorption of infrared radiation. This embodiment, compatible with the previous, is advantageous when the blank heating, prior to its stamping, is performed by radiant panels. Thus, the cleat does not undergo, or only to a small extent, the heating by the heat source.

Advantageously, the blank comprises at its periphery:
ai. a hole, called a guiding hole, not occupied by a locator when the blank is on the frame.

Thus, this guiding hole is able to orient the blank with regard to the die after the blank was transferred on the stamping tool.

Advantageously, the apparatus of the invention comprises:
f. a stamping die whose perimeter, in accordance with a plane called a closing plane, is inscribed in the internal opening surface of the frame.

Thus, the blank is advantageously transferred on the die means of the frame, said frame being able to retract from the die for not impeding the stamping.

Advantageously, the stamping die comprises:
fi. a centering finger able to cooperate with the guiding hole of the blank.

Thus, the guiding and positioning means of the die are replacing the frame positioning means once said frame clears out.

Advantageously, the guiding hole of the blank is a slotted hole. Thus, said hole enables the positioning of the blank in relation to the die while not impeding its sliding in the stamping direction.

The invention also concerns a method for stamping a composite blank including a continuous fibrous reinforcement in a thermoplastic matrix, using an apparatus in accordance with the invention; said method comprises the steps consisting in:
i. adjusting the position of the cleats on the frame according to the blank geometry;
ii. placing the blank on the cleats and introducing the locator in the bore of the blank;
iii. heating the blank, set on the frame cleats, up to a temperature equal or higher than the melting temperature of the thermoplastic matrix of the composite blank;
iv. transferring the blank, held on the cleats, on the die with the help of the frame;
v. separating the blank from frame while introducing the centering finger of the die in the slotted hole;
vi. stamping the blank.

Thus, the method of the invention allows to heat and to transfer the blank on the tooling, without being hindered by any blank support during the stamping. Thus, the mechanical quality of the parts obtained by this method is improved with regard to the stamping method of the prior art.

Advantageously, the method of the invention comprises before step i) a step consisting in:
vii. machining the slotted hole in the blank so that the major axis of said hole is oriented parallel with the sliding direction of the blank during stamping.

Thus, the blank is perfectly positioned in relation to the die, but no obstacle impedes the interlaminar slipping of plies during the stamping operation.

BRIEF DESCRIPTION OF THE DRAWINGS

The invention is described hereunder according to its preferred embodiments, in no way limiting, and in reference to FIGS. 1 to 6 in which.

DETAILED DESCRIPTION OF THE EMBODIMENTS

Figure 1:
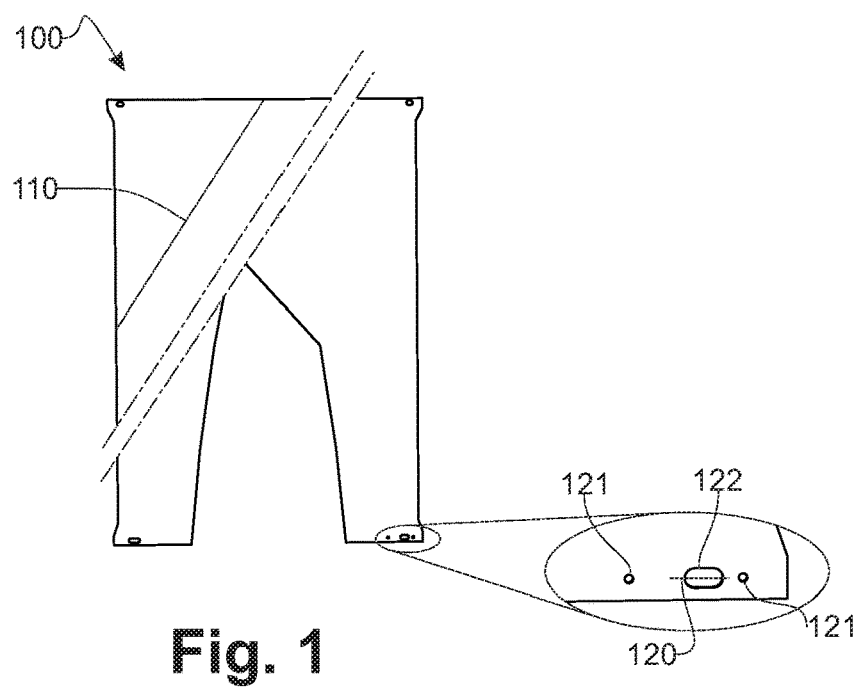
FIG. 1 shows, according to a top view, an exemplary embodiment of a machined blank in accordance with an embodiment of the apparatus of the invention.

FIG. 1, according to an exemplary embodiment, the apparatus of the invention includes a consolidated machined composite blank (100). The blank (100) is made of one or several stratified layers including continuous fibrous reinforcements (110), meaning that they extend from one edge to another of said blank (100), in a matrix made of a thermoplastic polymer. This blank is called machined, meaning that prior to its forming by stamping, it is routed according to a defined contour. Said routing is performed by any method known from the prior art, especially, but not exclusively, by means of a cutting tool or using a high pressure water jet. These routing operations include the cut out of holes (121, 122) intended to receive positioning elements of said blank (100) according to a tooling repository.

Figure 2:
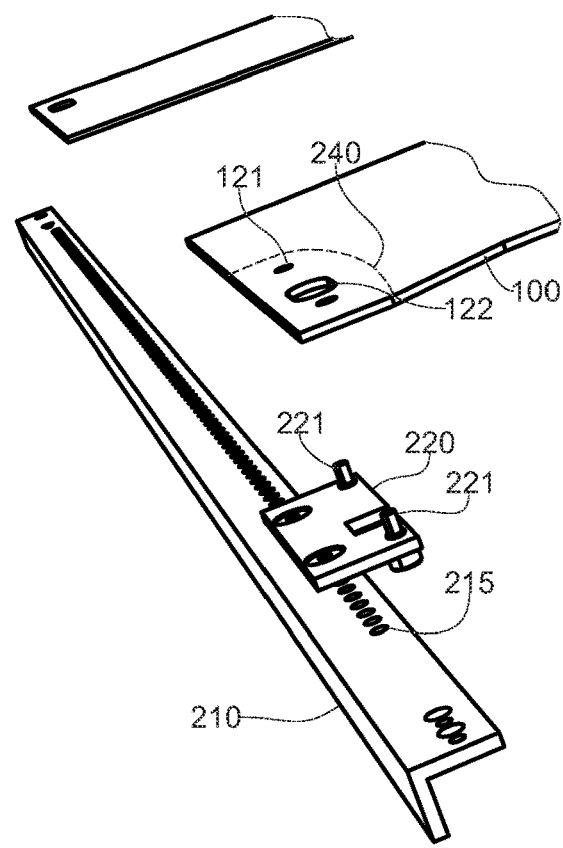
FIG. 2 represents, according to a perspective partial view, an exemplary embodiment of a transfer frame, including a locator and centering means of the blank.

FIG. 2, for its transfer from the heating station to the stamping tooling, the blank (100) is held by a frame which, according to this exemplary embodiment is made of an assembly of angle irons (210). Whole or part of said angle irons include means (215) for fixing a cleat (220) on said angle iron (210), Thus, according to this embodiment, a plurality of cleats (220) of this type is fixed at the periphery of the frame. According to this embodiment, two locators (221) are fixed to the cleats (220). Said locators (221) are capable to cooperate with hole (121) machined in the blank (100) in order to position the blank with relation to the frame. Thus, the part of blank (100) close to the locators (221) is in contact with the cleats (220) when the blank (100) lies on the frame. Advantageously, the cleat is made of a metallic material whose thermal diffusivity is at least 10 times higher than the thermal diffusivity of the polymer forming the matrix of the composite blank (100). The thermal diffusivity "E" is defined by the relation:

$$E = \sqrt{\lambda \cdot \rho \cdot C}$$

where $\lambda$ is the thermal conductivity coefficient of the material, $\rho$ its density and $C$ its specific heat. The thermal diffusivity of a material quantifies its capacity to exchange heat with its environment. Thus the thermal diffusivity of PEEK is 330 $J \cdot K^{-1} \cdot m^{-2} \cdot s^{-1/2}$, the thermal diffusivity of copper is 36 000 $J \cdot K^{-1} \cdot m^{-2} \cdot s^{-1/2}$, that of steel is 14 000 $J \cdot K^{-1} \cdot m^{-2} \cdot s^{-1/2}$. When a first material with thermal diffusivity $E_1$ is brought to the temperature $T_1$, then put in contact with a second material with thermal diffusivity $E_2$ and temperature $T_2$, the instant temperature T at the interface of two materials is given by the relation (neglecting the contact resistance):

$$T = \frac{E_1 T_1 + E_2 T_2}{E_1 + E_2}$$

Thus, in the exemplary embodiment where the polymer constituting the matrix of the blank is a PEEK, the cleat (220) is, for example, made of steel and its thermal diffusivity is 40 times higher than the one of the PEEK. Thus, the cleat absorbs the heat of the blank by conduction, next to the locator, so that the blank area (240), sensibly in contact with the cleat (220), is not brought to the melting temperature of the matrix upon the heating prior to the stamping of the blank. Thus, the stratification layers remain stuck to each other, in the vicinity of the locator (221) and of the hole (121) receiving said locator, and do not deform when the rest of the blank is brought to melting temperature the matrix. The blank (100) remains consequently well backed and well positioned in the frame with the help of the cleats and the locators (221), which enable to make the transfer of the blank from the heating station to the stamping tool without any risk of separation of the blank from the frame, and, on the other hand, to preserve the positioning of the blank and master this positioning in relation to the stamping tooling.

Figure 3:
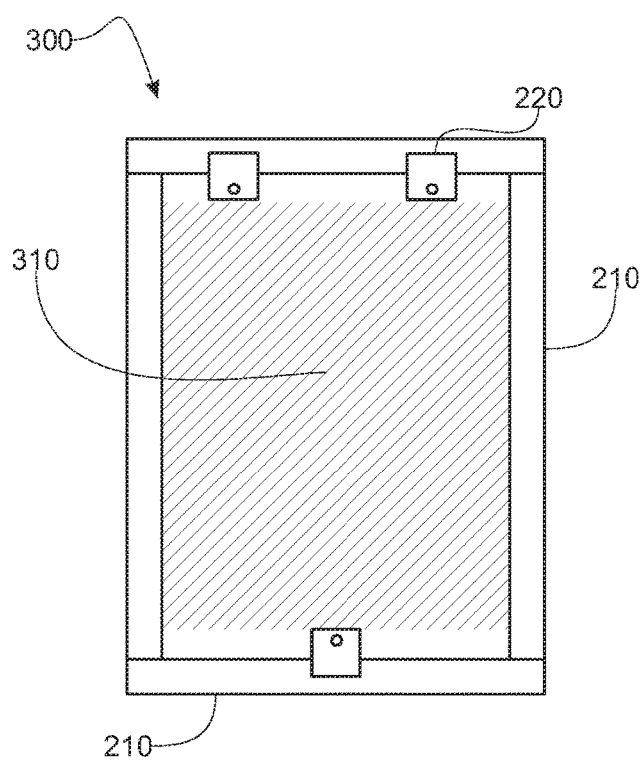
FIG. 3 is a top view of an exemplary embodiment of an assembled transfer frame.

FIG. 3, according to an embodiment of the apparatus of the invention, the transfer frame (300) is constituted by the assembly of profiles (210) especially angle irons on which the cleats (220) are fixed. The blank lies on said cleats which extend towards the interior of the frame and which, along with the angle irons (210) define an internal opening (310) free of any obstacle.

Returning to FIG. 2, the fixation means (215) of the cleats (220) allow to adjust the position of cleats (220) on the frame according to the blank shape and dimensions.

Figure 4:
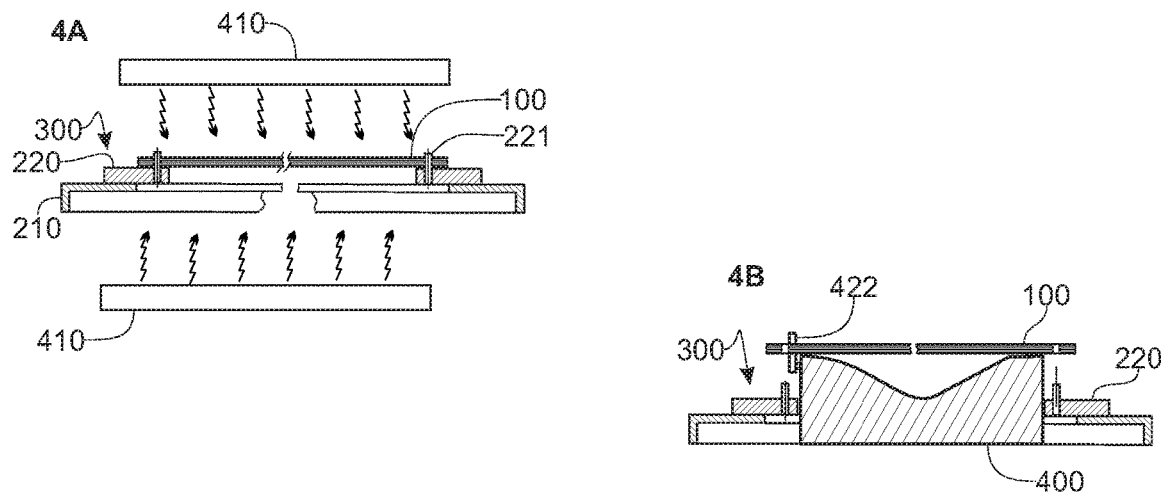
FIG. 4 illustrates, according to a front sectional view, the heating and stamping phases of a composite blank, using an embodiment of the apparatus of the invention.

FIG. 4A, according to an exemplary embodiment of the method of the invention, before its stamping, the consolidated blank (100), positioned on the cleats (220) of the frame (300), is heated up to the melting temperature of the matrix by means of a single or multiple radiant panels (410). During this heating phase, the polymer located in the blank areas that are in contact with the cleats (220), is not brought to its melting temperature, and the related portions of the plies of the lamination are keeping their interlaminar cohesion in these areas. According to this embodiment, the cleats (220), as well as the transfer frame, are advantageously subjected to a surface treatment in order to limit their infrared radiation absorption, so that they are not heated by radiation when using radiant panels (410) as heating means. As a non-limiting example, said cleats are polished or are subject to a glossy chroming or a reflective coating.

In FIG. 4B, the blank is transferred on the stamping die (400) by means of the frame (300). The perimeter of the stamping die (400) is inscribed within the free opening (310, FIG. 3) of the frame so that the frame and the blank are easily separated, as the frame (300) retracts by sliding along the edges of the stamping die (400), in accordance with this embodiment. During the layup of the blank (100) on the stamping die (400), a guiding finger (422), fixed to said stamping die (400), penetrates in the slotted hole (122, FIG. 1) of the blank.

Figure 5:
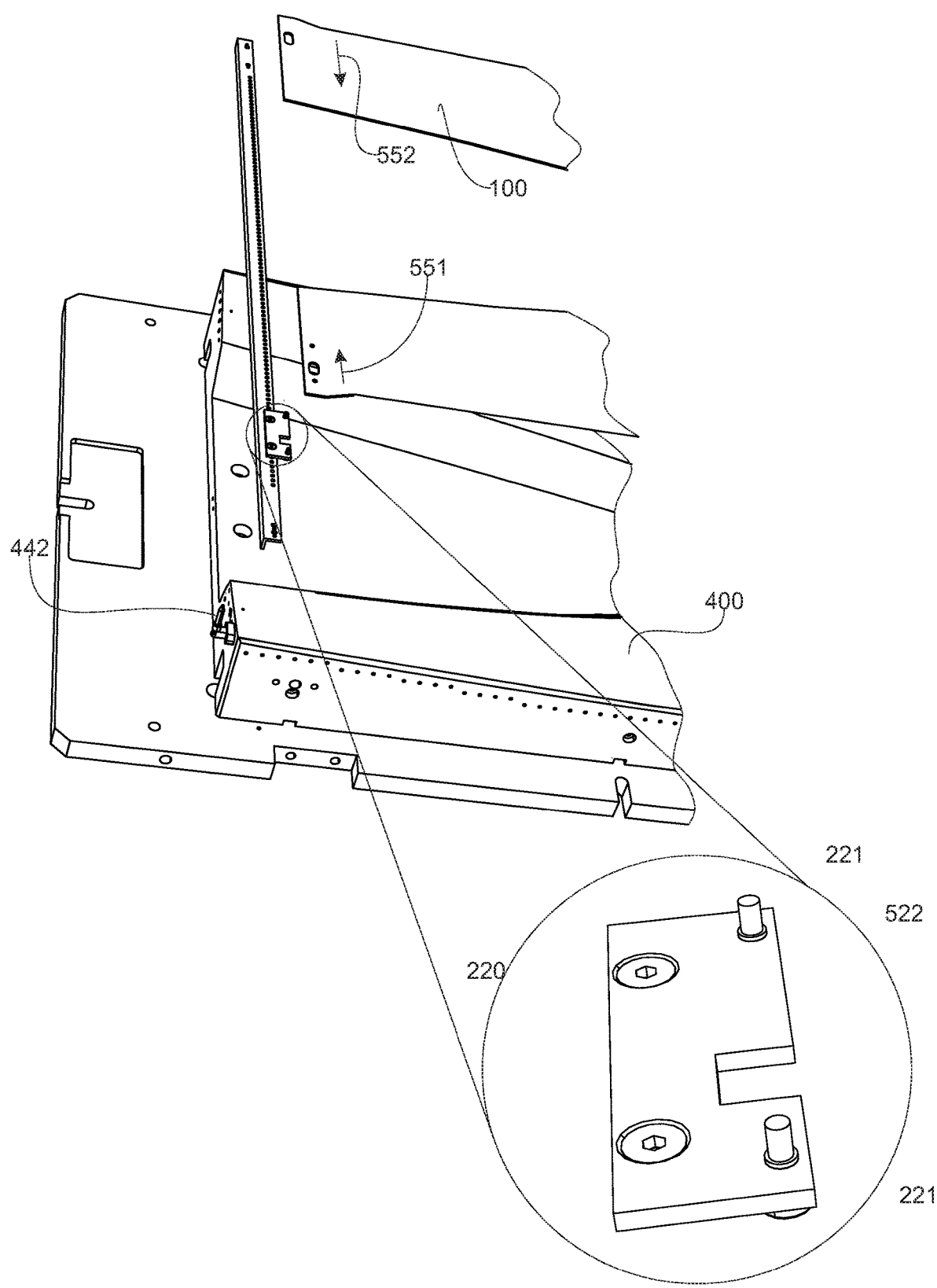
FIG. 5 shows, in accordance with a partial exploded view in perspective, an embodiment of the apparatus of the invention.

FIG. 5, in order to ensure the passing of the centering finger (422) of the stamping die (400), in accordance with this embodiment, the cleat (220) comprises a groove (522) allowing the passing of said finger in question (422) without disturbing the clearance of the frame. In accordance with this advantageous embodiment, the cleat (220) comprises two locators (221) cooperating with the cylindrical holes (121, FIG. 1) of the blank, situated on both sides of the slotted hole. Thus, upon the transfer and before the retractation of the frame, the slotted hole, situated in an area of the blank that keeps its cohesion after heating, is perfectly positioned in relation to the centering finger (422).

After being positioned in relation to the die (400), the blank (100) is immediately stamped by a rigid punch or a bladder so as to conform it to the stamping die shape. During this stamping operation, the material constituting the blank undergoes slipping (551, 552) with variable direction and amplitude, on the blank surface, depending on the shape of the die.

Returning to FIG. 1, the major axis (120) of the slotted hole (122) is advantageously oriented in order to allow a relative movement of the blank with regard to the centering finger of the die, parallel to the slipping direction experienced, during the stamping, by the considered area.

Figure 6:
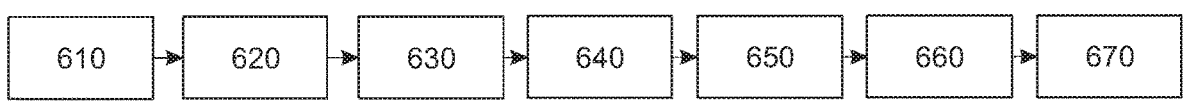
FIG. 6 is a flow diagram of the method according to the invention.

FIG. 6, the method of the invention comprises the steps consisting in:
cutting out (610) the blank. Said blank is thus advantageously cut out in panoply in a plate made of a composite material with a consolidated thermoplastic matrix. Such a plate is easy to manipulate and to machine. This machining includes the making of the slotted hole, the orientation and the length of this hole being determined by experience.
Adjusting (620) the cleats on the frame, the number of cleats and their position being determined by experience.
Placing (630) the blank on the cleats.
Transferring the blank and the frame under the heating means and heating (640) the blank equal to or higher than the melting temperature of the polymer constituting the matrix of said blank.
Transferring and placing (650) the blank on the stamping die and engaging the centering finger in the slotted hole.
retracting (660) the transfer frame.
Stamping (670) the blank.

The aforementioned description and the embodiments indicate that the invention reaches the targeted objectives, and more specifically it enables to heat a blank on a transfer frame in view of the hot stamping of said blank, ensuring an efficient backing of the blank on the frame during the transfer, an accurate position of the blank in relation to the forming die, without impeding the stamping operation.

The invention claimed is:

1. A system to stamp a thermoplastic matrix composite blank, the thermoplastic composite blank comprising a fibrous reinforcement in the form of continuous fibers that cannot be deformed physically, the system comprises:
a frame;
a stamping die;
a machined blank, made of a thermoplastic composite comprising non-deformable continuous fibers, routed according to a contour comprising cut out of holes configured to receive positioning elements of the frame;
a plurality of cleats fixed on the frame at adjustable positions and extending towards an interior of the frame and delimiting a surface of an internal opening of the frame, free from any obstacle;

a locator linked to a cleat and configured to cooperate with a guiding hole machined in the machined blank;

radiant panels to heat the machined blank while the machine blank is on the frame; and wherein said cleat linked to the locator is made of a material having a thermal diffusivity at least 10 times higher than a thermal diffusivity of a polymer forming the thermoplastic matrix composite blank, such that the cleat linked to the locator forms a heat sink; and wherein an outside perimeter of the stamping die is inscribed in the internal opening of the frame.

2. The system according to claim 1, wherein the cleat comprises a surface treatment to limit its absorption of an infrared radiation.

3. The system according to claim 1, wherein the machined blank further comprises, on its periphery, a guiding hole not occupied by the locator when the machined blank lies on the frame.

4. The system according to claim 3, further comprising a stamping die whose perimeter, in accordance with a closing plane, is inscribed in the internal opening surface of the frame; and wherein the stamping die comprises a centering finger configured to cooperate with the guiding hole not occupied by the locator.

5. The system according to claim 4, wherein the guiding hole not occupied by the locator is a slotted hole.

6. The system according to claim 1, wherein the machined blank comprises, on its periphery, a guiding hole not occupied by the locator when the machined blank lies on the frame; and wherein the stamping die comprises a centering finger configured to cooperate with the guiding hole not occupied by the locator.

7. The system according to claim 6, wherein the guiding hole not occupied by the locator is a slotted hole.

* * * * *